United States Patent
Plante et al.

(10) Patent No.: US 10,339,732 B2
(45) Date of Patent: Jul. 2, 2019

(54) VEHICLE OPERATOR PERFORMANCE HISTORY RECORDING, SCORING AND REPORTING SYSTEMS

(71) Applicant: SmartDrive Systems, Inc., San Diego, CA (US)

(72) Inventors: James Plante, Del Mar, CA (US); Ramesh Kasavaraju, San Diego, CA (US); Gregory Mauro, San Diego, CA (US); Andrew Nickerson, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

(21) Appl. No.: 15/658,136

(22) Filed: Jul. 24, 2017

(65) Prior Publication Data

US 2017/0323494 A1    Nov. 9, 2017

Related U.S. Application Data

(63) Continuation of application No. 14/529,134, filed on Oct. 30, 2014, now Pat. No. 9,761,067, which is a
(Continued)

(51) Int. Cl.
*G01M 17/00*    (2006.01)
*G06F 7/00*     (2006.01)
(Continued)

(52) U.S. Cl.
CPC ............ *G07C 5/085* (2013.01); *B60W 40/08* (2013.01)

(58) Field of Classification Search
None
See application file for complete search history.

(56) References Cited

U.S. PATENT DOCUMENTS 2,943,141 A    6/1960 Knight
3,634,866 A    1/1972 Meyer
(Continued)

FOREIGN PATENT DOCUMENTS

CA    2469728       12/2005
CA    2469728 A1    12/2005
(Continued)

OTHER PUBLICATIONS

Adaptec published and sold its VideoOh! DVD software USB 2.0 Edition in at least Jan. 24, 2003. (1 pg.).
(Continued)

*Primary Examiner* — Bhavesh V Amin
(74) *Attorney, Agent, or Firm* — Esplin & Associates, PC

(57) ABSTRACT

A driver history report may include many factors to express performance or quality of driver service. Vehicle event recorders are coupled to systems which form an association between collected data and the vehicle operator in command of the vehicle at the event moment. Systems provide means for long-term storage of data particularly data in a structure which preserves the association between a driver and event records attributed to him. Special recall operations executed against stored data yields operator performance reporting—including a single value performance score indicative of a vehicle operator's performance and safety history. An analyzer system operates to recall data, particularly data from a plurality of events all associated with a single operator but recorded over an extended period of time. Data is arranged such that mathematical analysis may be applied independently to various data elements or data "fields" to produce performance metrics and ratios which reflect performance.

12 Claims, 5 Drawing Sheets

Related U.S. Application Data continuation of application No. 11/593,659, filed on Nov. 7, 2006, now Pat. No. 8,989,959.

(51) Int. Cl.
*G07C 5/08* (2006.01)
*B60W 40/08* (2012.01)

(56) References Cited

U.S. PATENT DOCUMENTS

| | | | |
|---|---|---|---|
| 3,781,824 A | 12/1973 | Caiati | |
| 3,812,287 A | 5/1974 | Lemelson | |
| 3,885,090 A | 5/1975 | Rosenbaum | |
| 3,992,656 A | 11/1976 | Joy | |
| 4,054,752 A | 10/1977 | Dennis, Jr. | |
| 4,072,850 A * | 2/1978 | McGlynn | G07C 5/0841 340/425.5 |
| 4,258,421 A | 3/1981 | Juhasz | |
| 4,271,358 A | 6/1981 | Schwarz | |
| 4,276,609 A | 6/1981 | Patel | |
| 4,280,151 A | 7/1981 | Tsunekawa | |
| 4,281,354 A | 7/1981 | Conte | |
| 4,401,976 A | 8/1983 | Stadelmayr | |
| 4,409,670 A | 10/1983 | Herndon | |
| 4,420,773 A | 12/1983 | Toyoda | |
| 4,425,097 A | 1/1984 | Owens | |
| 4,456,931 A | 6/1984 | Toyoda | |
| 4,489,351 A | 12/1984 | dAlayer de Costemore dArc | |
| 4,496,995 A | 1/1985 | Colles | |
| 4,500,868 A | 2/1985 | Tokitsu | |
| 4,528,547 A | 7/1985 | Rodney | |
| 4,533,962 A | 8/1985 | Decker | |
| 4,558,379 A | 12/1985 | Hu/tter | |
| 4,588,267 A | 5/1986 | Pastore | |
| 4,593,313 A | 6/1986 | Nagasaki | |
| 4,621,335 A | 11/1986 | Bluish | |
| 4,625,210 A | 11/1986 | Sagl | |
| 4,630,110 A | 12/1986 | Cotton | |
| 4,632,348 A | 12/1986 | Keesling | |
| 4,638,289 A | 1/1987 | Zottnik | |
| 4,646,241 A | 2/1987 | Ratchford | |
| 4,651,143 A | 3/1987 | Yamanaka | |
| 4,671,111 A | 6/1987 | Lemelson | |
| 4,718,685 A | 1/1988 | Kawabe | |
| 4,754,255 A * | 6/1988 | Sanders | B60R 25/04 180/287 |
| 4,758,888 A | 7/1988 | Lapidot | |
| 4,763,745 A | 8/1988 | Eto | |
| 4,785,474 A | 11/1988 | Bernstein | |
| 4,789,904 A | 12/1988 | Peterson | |
| 4,794,566 A | 12/1988 | Richards | |
| 4,804,937 A | 2/1989 | Barbiaux | |
| 4,806,931 A | 2/1989 | Nelson | |
| 4,807,096 A | 2/1989 | Skogler | |
| 4,814,896 A | 3/1989 | Heitzman | |
| 4,837,628 A | 6/1989 | Sasaki | |
| 4,839,631 A | 6/1989 | Tsuji | |
| 4,843,463 A | 6/1989 | Michetti | |
| 4,843,578 A | 6/1989 | Wade | |
| 4,853,856 A | 8/1989 | Hanway | |
| 4,853,859 A * | 8/1989 | Morita | G07C 9/00039 340/459 |
| 4,866,616 A | 9/1989 | Takeuchi | |
| 4,876,597 A | 10/1989 | Roy | |
| 4,883,349 A | 11/1989 | Mittelhauser | |
| 4,896,855 A | 1/1990 | Furnish | |
| 4,926,331 A | 5/1990 | Windle | |
| 4,930,742 A | 6/1990 | Schofield | |
| 4,936,533 A | 6/1990 | Adams | |
| 4,939,652 A | 7/1990 | Steiner | |
| 4,942,464 A | 7/1990 | Milatz | |
| 4,945,244 A | 7/1990 | Castleman | |
| 4,949,186 A | 8/1990 | Peterson | |
| 4,980,913 A | 12/1990 | Skret | |
| 4,987,541 A | 1/1991 | Levente | |
| 4,992,943 A | 2/1991 | McCracken | |
| 4,993,068 A * | 2/1991 | Piosenka | G06F 21/32 235/380 |
| 4,995,086 A * | 2/1991 | Lilley | G06K 9/00006 235/380 |
| 5,012,335 A | 4/1991 | Cohodar | |
| 5,027,104 A | 6/1991 | Reid | |
| 5,046,007 A | 9/1991 | McCrery | |
| 5,050,166 A | 9/1991 | Cantoni | |
| 5,056,056 A | 10/1991 | Gustin | |
| 5,057,820 A | 10/1991 | Markson | |
| 5,096,287 A | 3/1992 | Kakinami | |
| 5,100,095 A | 3/1992 | Haan | |
| 5,111,289 A | 5/1992 | Lucas | |
| 5,140,434 A | 8/1992 | Van Blessinger | |
| 5,140,436 A | 8/1992 | Blessinger | |
| 5,140,438 A | 8/1992 | Kurahashi | |
| 5,144,661 A | 9/1992 | Shamosh | |
| 5,178,448 A | 1/1993 | Adams | |
| 5,185,700 A | 2/1993 | Bezos | |
| 5,196,938 A | 3/1993 | Blessinger | |
| 5,223,844 A | 6/1993 | Mansell | |
| 5,224,211 A | 6/1993 | Roe | |
| 5,262,813 A | 11/1993 | Scharton | |
| 5,283,433 A | 2/1994 | Tsien | |
| 5,294,978 A | 3/1994 | Katayama | |
| 5,305,214 A | 4/1994 | Komatsu | |
| 5,305,216 A | 4/1994 | Okura | |
| 5,308,247 A | 5/1994 | Dyrdek | |
| 5,309,485 A | 5/1994 | Chao | |
| 5,311,197 A | 5/1994 | Sorden | |
| 5,321,753 A | 6/1994 | Gritton | |
| 5,327,288 A | 7/1994 | Wellington | |
| 5,330,149 A | 7/1994 | Haan | |
| 5,333,759 A | 8/1994 | Deering | |
| 5,343,527 A | 8/1994 | Moore | |
| 5,353,023 A | 10/1994 | Mitsugi | |
| 5,361,326 A | 11/1994 | Aparicio, IV | |
| 5,387,926 A | 2/1995 | Bellan | |
| 5,388,045 A | 2/1995 | Kamiya | |
| 5,388,208 A | 2/1995 | Weingartner | |
| 5,404,330 A | 4/1995 | Lee | |
| 5,408,330 A | 4/1995 | Squicciarini | |
| 5,422,543 A | 6/1995 | Weinberg | |
| 5,430,431 A | 7/1995 | Nelson | |
| 5,430,432 A | 7/1995 | Camhi | |
| 5,435,184 A | 7/1995 | Pineroli | |
| 5,445,024 A | 8/1995 | Riley, Jr. | |
| 5,445,027 A | 8/1995 | Zorner | |
| 5,446,659 A | 8/1995 | Yamawaki | |
| 5,455,625 A | 10/1995 | Englander | |
| 5,455,716 A | 10/1995 | Suman | |
| 5,465,079 A | 11/1995 | Bouchard | |
| 5,473,729 A | 12/1995 | Bryant | |
| 5,477,141 A | 12/1995 | Nather | |
| 5,495,242 A | 2/1996 | Kick | |
| 5,495,243 A | 2/1996 | McKenna | |
| 5,497,419 A | 3/1996 | Hill | |
| 5,499,182 A * | 3/1996 | Ousborne | G07C 5/0858 340/439 |
| 5,504,482 A | 4/1996 | Schreder | |
| 5,505,076 A * | 4/1996 | Parkman | G01F 9/008 73/114.52 |
| 5,513,011 A | 4/1996 | Matsumoto | |
| 5,515,285 A | 5/1996 | Garrett, Sr. | |
| 5,519,260 A * | 5/1996 | Washington | B60R 25/04 123/198 DC |
| 5,521,633 A | 5/1996 | Nakajima | |
| 5,523,811 A | 6/1996 | Wada | |
| 5,526,269 A | 6/1996 | Ishibashi | |
| 5,530,420 A | 6/1996 | Tsuchiya | |
| 5,532,678 A | 7/1996 | Kin | |
| 5,537,156 A | 7/1996 | Katayama | |
| 5,539,454 A | 7/1996 | Williams | |
| 5,541,590 A | 7/1996 | Nishio | |
| 5,544,060 A | 8/1996 | Fujii | |
| 5,546,191 A | 8/1996 | Hibi | |
| 5,546,305 A | 8/1996 | Kondo | |
| 5,548,273 A | 8/1996 | Nicol | |

(56) References Cited

U.S. PATENT DOCUMENTS

| | | | |
|---|---|---|---|
| 5,552,990 A | 9/1996 | Ihara | |
| 5,559,496 A | 9/1996 | Dubats | |
| 5,568,211 A | 10/1996 | Bamford | |
| 5,570,087 A | 10/1996 | Lemelson | |
| 5,570,127 A | 10/1996 | Schmidt | |
| 5,574,424 A | 11/1996 | Nguyen | |
| 5,574,443 A | 11/1996 | Hsieh | |
| D376,571 S | 12/1996 | Kokat | |
| 5,581,464 A * | 12/1996 | Woll | G01S 13/931 180/287 |
| 5,586,130 A | 12/1996 | Doyle | |
| 5,590,948 A | 1/1997 | Moreno | |
| 5,596,382 A | 1/1997 | Bamford | |
| 5,596,647 A | 1/1997 | Wakai | |
| 5,600,775 A | 2/1997 | King | |
| 5,608,272 A | 3/1997 | Tanguay | |
| 5,610,580 A | 3/1997 | Lai | |
| 5,612,686 A | 3/1997 | Takano | |
| 5,631,638 A | 5/1997 | Kaspar | |
| 5,638,273 A | 6/1997 | Coiner | |
| 5,642,106 A | 6/1997 | Hancock | |
| 5,646,856 A | 7/1997 | Kaesser | |
| 5,652,706 A | 7/1997 | Morimoto | |
| RE35,590 E | 8/1997 | Bezos | |
| 5,654,892 A | 8/1997 | Fujii | |
| 5,659,355 A | 8/1997 | Barron | |
| 5,666,120 A | 9/1997 | Kline | |
| 5,667,176 A | 9/1997 | Zamarripa | |
| 5,669,698 A | 9/1997 | Veldman | |
| 5,671,451 A | 9/1997 | Takahashi | |
| 5,677,979 A | 10/1997 | Squicciarini | |
| 5,680,117 A | 10/1997 | Arai | |
| 5,680,123 A | 10/1997 | Lee | |
| 5,686,765 A * | 11/1997 | Washington | B60R 25/04 180/287 |
| 5,686,889 A | 11/1997 | Hillis | |
| 5,689,442 A | 11/1997 | Swanson | |
| 5,696,705 A | 12/1997 | Zykan | |
| 5,706,362 A | 1/1998 | Yabe | |
| 5,706,909 A | 1/1998 | Bevins | |
| 5,712,679 A | 1/1998 | Coles | |
| 5,717,456 A | 2/1998 | Rudt | |
| 5,719,554 A * | 2/1998 | Gagnon | B60R 16/0232 340/429 |
| 5,758,299 A * | 5/1998 | Sandborg | G09B 19/167 340/439 |
| 5,781,101 A * | 7/1998 | Stephen | G08B 25/016 340/286.01 |
| 5,781,145 A | 7/1998 | Williams | |
| 5,784,007 A | 7/1998 | Pepper | |
| 5,784,021 A | 7/1998 | Oliva | |
| 5,784,521 A | 7/1998 | Nakatani | |
| 5,790,403 A | 8/1998 | Nakayama | |
| 5,790,973 A | 8/1998 | Blaker | |
| 5,793,308 A | 8/1998 | Rosinski | |
| 5,793,420 A | 8/1998 | Schmidt | |
| 5,793,739 A | 8/1998 | Tanaka | |
| 5,793,985 A | 8/1998 | Natarajan | |
| 5,794,165 A | 8/1998 | Minowa | |
| 5,797,134 A | 8/1998 | McMillan | |
| 5,798,458 A | 8/1998 | Monroe | |
| 5,800,040 A | 9/1998 | Santo | |
| 5,802,545 A | 9/1998 | Coverdill | |
| 5,802,727 A | 9/1998 | Blank | |
| 5,805,079 A | 9/1998 | Lemelson | |
| 5,813,745 A | 9/1998 | Fant, Jr. | |
| 5,815,071 A | 9/1998 | Doyle | |
| 5,815,093 A | 9/1998 | Kikinis | |
| 5,819,198 A | 10/1998 | Peretz | |
| 5,825,284 A | 10/1998 | Dunwoody | |
| 5,825,412 A | 10/1998 | Hobson | |
| 5,844,505 A | 12/1998 | Van Ryzin | |
| 5,845,733 A * | 12/1998 | Wolfsen | B60R 25/04 307/10.3 |
| 5,867,802 A * | 2/1999 | Borza | G07C 9/00158 307/10.2 |
| 5,877,897 A | 3/1999 | Schofield | |
| 5,896,167 A | 4/1999 | Omae | |
| 5,897,602 A * | 4/1999 | Mizuta | G07C 5/0858 340/990 |
| 5,897,606 A | 4/1999 | Miura | |
| 5,899,956 A | 5/1999 | Chan | |
| 5,901,806 A | 5/1999 | Takahashi | |
| 5,914,748 A | 6/1999 | Parulski | |
| 5,919,239 A | 7/1999 | Fraker | |
| 5,926,210 A | 7/1999 | Hackett | |
| 5,928,291 A | 7/1999 | Jenkins | |
| 5,938,321 A | 8/1999 | Bos | |
| 5,946,404 A | 8/1999 | Bakshi | |
| 5,948,038 A | 9/1999 | Daly | |
| 5,959,367 A | 9/1999 | OFarrell | |
| 5,978,017 A | 11/1999 | Tino | |
| 6,002,326 A | 12/1999 | Turner | |
| 6,006,148 A | 12/1999 | Strong | |
| 6,008,723 A | 12/1999 | Yassan | |
| 6,008,841 A | 12/1999 | Charlson | |
| 6,009,370 A | 12/1999 | Minowa | |
| 6,011,492 A | 1/2000 | Garesche | |
| 6,028,528 A | 2/2000 | Lorenzetti | |
| 6,037,860 A | 3/2000 | Zander | |
| 6,037,977 A | 3/2000 | Peterson | |
| 6,041,410 A * | 3/2000 | Hsu | G06K 9/00013 380/285 |
| 6,049,079 A | 4/2000 | Noordam | |
| 6,057,754 A | 5/2000 | Kinoshita | |
| 6,060,989 A | 5/2000 | Gehlot | |
| 6,064,792 A | 5/2000 | Fox | |
| 6,067,488 A | 5/2000 | Tano | |
| 6,076,026 A | 6/2000 | Jambhekar | |
| 6,084,870 A | 7/2000 | Wooten | |
| 6,088,635 A | 7/2000 | Cox | |
| 6,092,008 A | 7/2000 | Bateman | |
| 6,092,021 A | 7/2000 | Ehlbeck | |
| 6,092,193 A | 7/2000 | Loomis | |
| 6,100,811 A | 8/2000 | Hsu | |
| 6,111,254 A | 8/2000 | Eden | |
| 6,118,768 A | 9/2000 | Bhatia | |
| 6,122,738 A | 9/2000 | Millard | |
| 6,141,611 A | 10/2000 | Mackey | |
| 6,144,296 A | 11/2000 | Ishida | |
| 6,147,598 A | 11/2000 | Murphy | |
| 6,151,065 A | 11/2000 | Steed | |
| 6,163,338 A | 12/2000 | Johnson | |
| 6,163,749 A | 12/2000 | McDonough | |
| 6,167,186 A | 12/2000 | Kawasaki | |
| 6,170,742 B1 * | 1/2001 | Yacoob | G06Q 20/341 235/375 |
| 6,181,373 B1 | 1/2001 | Coles | |
| 6,182,010 B1 | 1/2001 | Berstis | |
| 6,185,490 B1 | 2/2001 | Ferguson | |
| 6,195,605 B1 | 2/2001 | Tabler | |
| 6,200,139 B1 | 3/2001 | Clapper | |
| 6,208,919 B1 | 3/2001 | Barkesseh | |
| 6,211,907 B1 | 4/2001 | Scaman | |
| 6,218,960 B1 | 4/2001 | Ishikawa | |
| 6,246,933 B1 * | 6/2001 | Bague | G07C 5/085 340/438 |
| 6,246,934 B1 | 6/2001 | Otake | |
| 6,252,544 B1 | 6/2001 | Hoffberg | |
| 6,253,129 B1 * | 6/2001 | Jenkins | G07C 5/008 340/438 |
| 6,259,475 B1 | 7/2001 | Ramachandran | |
| 6,263,265 B1 | 7/2001 | Fera | |
| 6,266,588 B1 * | 7/2001 | McClellan | G01D 9/005 180/274 |
| 6,298,290 B1 | 10/2001 | Abe | |
| 6,300,875 B1 | 10/2001 | Schafer | |
| 6,317,682 B1 | 11/2001 | Ogura | |
| 6,324,450 B1 * | 11/2001 | Iwama | G07C 5/085 340/326 |
| 6,333,759 B1 | 12/2001 | Mazzilli | |
| 6,337,622 B1 | 1/2002 | Sugano | |

(56) References Cited

U.S. PATENT DOCUMENTS

| | | |
|---|---|---|
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 * | 6/2002 | Lemelson ............ B60Q 1/0023 307/10.5 |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 * | 12/2002 | Fish ................ G07C 5/008 340/439 |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 * | 1/2003 | Ishifuji ............ G06Q 20/341 235/380 |
| 6,516,256 B1 | 2/2003 | Hartmann |
| 6,518,881 B2 | 2/2003 | Monroe |
| 6,525,672 B2 | 2/2003 | Chainer |
| 6,526,352 B1 * | 2/2003 | Breed ............ G01C 21/3697 342/357.31 |
| 6,529,159 B1 | 3/2003 | Fan |
| 6,535,804 B1 | 3/2003 | Chun |
| 6,552,682 B1 | 4/2003 | Fan |
| 6,553,308 B1 * | 4/2003 | Uhlmann ............ B61L 29/24 340/988 |
| 6,556,905 B1 | 4/2003 | Mittelsteadt |
| 6,559,769 B2 | 5/2003 | Anthony |
| 6,574,538 B2 * | 6/2003 | Sasaki ............ G08G 1/205 701/32.2 |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 * | 9/2004 | Doyle ............ G07C 5/085 340/438 |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 * | 3/2005 | Mittelsteadt ............ G07C 5/008 340/905 |
| 6,867,733 B2 | 3/2005 | Sandhu |
| 6,873,261 B2 | 3/2005 | Anthony |
| 6,882,313 B1 | 4/2005 | Fan |
| 6,882,912 B2 * | 4/2005 | DiLodovico ............ G08G 1/164 701/301 |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,954,689 B2 | 10/2005 | Hanson |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 * | 4/2006 | Prokoski ............ G06K 9/00248 180/272 |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 * | 11/2006 | Dutu ............ B60R 25/02102 340/5.53 |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 * | 9/2007 | Simon ............ B60R 25/2018 705/35 |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |

(56) References Cited

U.S. PATENT DOCUMENTS

| | | | |
|---|---|---|---|
| 7,389,178 B2* | 6/2008 | Raz | G07C 5/085 |
| | | | 340/903 |
| 7,398,140 B2 | 7/2008 | Kernwein | |
| 7,457,693 B2 | 11/2008 | Olsen | |
| 7,471,189 B2 | 12/2008 | Vastad | |
| 7,471,192 B2* | 12/2008 | Hara | B60R 25/04 |
| | | | 340/425.5 |
| 7,536,457 B2 | 5/2009 | Miller | |
| 7,548,586 B1 | 6/2009 | Mimar | |
| 7,561,054 B2 | 7/2009 | Raz | |
| 7,584,033 B2* | 9/2009 | Mittelsteadt | G06Q 40/08 |
| | | | 340/870.05 |
| 7,596,439 B2 | 9/2009 | Oesterling | |
| 7,623,754 B1 | 11/2009 | McKain | |
| 7,659,827 B2 | 2/2010 | Gunderson | |
| 7,659,835 B2 | 2/2010 | Jung | |
| 7,667,731 B2 | 2/2010 | Kreiner | |
| 7,689,001 B2 | 3/2010 | Kim | |
| 7,702,442 B2 | 4/2010 | Takenaka | |
| 7,725,216 B2 | 5/2010 | Kim | |
| 7,768,548 B2 | 8/2010 | Silvernail | |
| 7,769,499 B2 | 8/2010 | McQuade | |
| 7,783,956 B2* | 8/2010 | Ko | G06F 11/1441 |
| | | | 714/763 |
| 7,804,426 B2 | 9/2010 | Etcheson | |
| 7,821,421 B2 | 10/2010 | Tamir | |
| 7,845,560 B2 | 12/2010 | Emanuel | |
| 7,853,376 B2 | 12/2010 | Peng | |
| 7,868,912 B2 | 1/2011 | Venetianer | |
| 7,893,958 B1* | 2/2011 | D'Agostino | B60R 11/04 |
| | | | 348/148 |
| 7,940,250 B2 | 5/2011 | Forstall | |
| 7,941,258 B1* | 5/2011 | Mittelsteadt | G07C 5/008 |
| | | | 340/438 |
| 7,974,748 B2 | 7/2011 | Goerick | |
| 7,984,146 B2* | 7/2011 | Rozak | G06Q 10/06 |
| | | | 701/29.3 |
| 8,054,168 B2 | 11/2011 | McCormick | |
| 8,068,979 B2 | 11/2011 | Breed | |
| 8,090,598 B2* | 1/2012 | Bauer | G06Q 40/02 |
| | | | 701/1 |
| 8,113,844 B2 | 2/2012 | Huang | |
| 8,139,820 B2* | 3/2012 | Plante | G07C 5/008 |
| | | | 340/438 |
| 8,140,265 B2 | 3/2012 | Grush | |
| 8,140,358 B1 | 3/2012 | Ling | |
| 8,152,198 B2 | 4/2012 | Breed | |
| 8,239,092 B2 | 8/2012 | Plante | |
| 8,269,617 B2* | 9/2012 | Cook | G07C 5/085 |
| | | | 340/439 |
| 8,311,858 B2 | 11/2012 | Everett | |
| 8,314,708 B2 | 11/2012 | Gunderson | |
| 8,321,066 B2 | 11/2012 | Becker | |
| 8,373,567 B2* | 2/2013 | Denson | G07C 5/008 |
| | | | 340/576 |
| 8,417,562 B1 | 4/2013 | Siemens | |
| 8,423,009 B2* | 4/2013 | Srinivasan | H04L 67/06 |
| | | | 455/419 |
| 8,442,690 B2 | 5/2013 | Goldstein | |
| 8,471,701 B2 | 6/2013 | Yariv | |
| 8,508,353 B2 | 8/2013 | Cook | |
| 8,538,696 B1 | 9/2013 | Cassanova | |
| 8,538,785 B2 | 9/2013 | Coleman | |
| 8,564,426 B2 | 10/2013 | Cook | |
| 8,564,446 B2 | 10/2013 | Gunderson | |
| 8,571,755 B2 | 10/2013 | Plante | |
| 8,577,703 B2* | 11/2013 | McClellan | G06Q 40/02 |
| | | | 705/7.11 |
| 8,606,492 B1 | 12/2013 | Botnen | |
| 8,634,958 B1 | 1/2014 | Chiappetta | |
| 8,635,557 B2 | 1/2014 | Geise | |
| 8,676,428 B2 | 3/2014 | Richardson | |
| 8,744,642 B2 | 6/2014 | Nemat-Nasser | |
| 8,775,067 B2 | 7/2014 | Cho | |
| 8,781,292 B1 | 7/2014 | Ross | |
| 8,803,695 B2 | 8/2014 | Denson | |
| 8,805,110 B2 | 8/2014 | Rhoads | |
| 8,849,501 B2 | 9/2014 | Cook | |
| 8,855,847 B2 | 10/2014 | Uehara | |
| 8,862,395 B2 | 10/2014 | Richardson | |
| 8,868,288 B2 | 10/2014 | Plante | |
| 8,880,279 B2 | 11/2014 | Plante | |
| 8,892,310 B1 | 11/2014 | Palmer | |
| 8,989,959 B2 | 3/2015 | Plante | |
| 8,996,234 B1 | 3/2015 | Tamari | |
| 8,996,240 B2 | 3/2015 | Plante | |
| 9,047,721 B1 | 6/2015 | Botnen | |
| 9,085,362 B1 | 7/2015 | Kilian | |
| 9,183,679 B2 | 11/2015 | Plante | |
| 9,201,842 B2 | 12/2015 | Plante | |
| 9,208,129 B2 | 12/2015 | Plante | |
| 9,226,004 B1 | 12/2015 | Plante | |
| 9,240,079 B2 | 1/2016 | Lambert | |
| 9,607,526 B1 | 3/2017 | Hsu-Hoffman | |
| 9,610,955 B2 | 4/2017 | Palmer | |
| 9,715,711 B1 | 7/2017 | Konrardy | |
| 9,754,325 B1 | 9/2017 | Konrardy | |
| 9,767,516 B1 | 9/2017 | Konrardy | |
| 9,786,154 B1 | 10/2017 | Potter | |
| 9,792,656 B1 | 10/2017 | Konrardy | |
| 9,805,423 B1 | 10/2017 | Konrardy | |
| 9,805,601 B1 | 10/2017 | Fields | |
| 9,858,621 B1 | 1/2018 | Konrardy | |
| 9,868,394 B1 | 1/2018 | Fields | |
| 9,870,649 B1 | 1/2018 | Fields | |
| 9,942,526 B2 | 4/2018 | Plante | |
| 2001/0005217 A1 | 6/2001 | Hamilton | |
| 2001/0005804 A1 | 6/2001 | Rayner | |
| 2001/0018628 A1 | 8/2001 | Jenkins | |
| 2001/0020204 A1 | 9/2001 | Runyon | |
| 2001/0052730 A1 | 12/2001 | Baur | |
| 2002/0019689 A1 | 2/2002 | Harrison | |
| 2002/0027502 A1 | 3/2002 | Mayor | |
| 2002/0029109 A1 | 3/2002 | Wong | |
| 2002/0035422 A1 | 3/2002 | Sasaki | |
| 2002/0044225 A1 | 4/2002 | Rakib | |
| 2002/0059453 A1 | 5/2002 | Eriksson | |
| 2002/0061758 A1 | 5/2002 | Zarlengo | |
| 2002/0067076 A1 | 6/2002 | Talbot | |
| 2002/0087240 A1 | 7/2002 | Raithel | |
| 2002/0091473 A1 | 7/2002 | Gardner | |
| 2002/0105438 A1 | 8/2002 | Forbes | |
| 2002/0107619 A1 | 8/2002 | Klausner | |
| 2002/0111725 A1 | 8/2002 | Burge | |
| 2002/0111756 A1 | 8/2002 | Modgil | |
| 2002/0118206 A1 | 8/2002 | Knittel | |
| 2002/0120374 A1 | 8/2002 | Douros | |
| 2002/0135679 A1 | 9/2002 | Scaman | |
| 2002/0138587 A1 | 9/2002 | Koehler | |
| 2002/0156558 A1 | 10/2002 | Hanson | |
| 2002/0163532 A1 | 11/2002 | Thomas | |
| 2002/0169529 A1 | 11/2002 | Kim | |
| 2002/0169530 A1 | 11/2002 | Laguer-Diaz | |
| 2002/0183905 A1 | 12/2002 | Maeda | |
| 2003/0016753 A1 | 1/2003 | Kim | |
| 2003/0028298 A1 | 2/2003 | Macky | |
| 2003/0053433 A1 | 3/2003 | Chun | |
| 2003/0055557 A1 | 3/2003 | Dutta | |
| 2003/0055666 A1 | 3/2003 | Roddy | |
| 2003/0065805 A1 | 4/2003 | Barnes | |
| 2003/0067541 A1 | 4/2003 | Joao | |
| 2003/0079041 A1 | 4/2003 | Parrella | |
| 2003/0080713 A1 | 5/2003 | Kirmuss | |
| 2003/0080878 A1 | 5/2003 | Kirmuss | |
| 2003/0081121 A1 | 5/2003 | Kirmuss | |
| 2003/0081122 A1 | 5/2003 | Kirmuss | |
| 2003/0081123 A1 | 5/2003 | Rupe | |
| 2003/0081127 A1 | 5/2003 | Kirmuss | |
| 2003/0081128 A1 | 5/2003 | Kirmuss | |
| 2003/0081934 A1 | 5/2003 | Kirmuss | |
| 2003/0081935 A1 | 5/2003 | Kirmuss | |
| 2003/0095688 A1 | 5/2003 | Kirmuss | |
| 2003/0112133 A1 | 6/2003 | Webb | |

(56) References Cited

U.S. PATENT DOCUMENTS

| | | |
|---|---|---|
| 2003/0125854 A1 | 7/2003 | Kawasaki |
| 2003/0137194 A1 | 7/2003 | White |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0201875 A1 | 10/2003 | Kuo |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0032493 A1 | 2/2004 | Franke |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0257208 A1 | 12/2004 | Huang |
| 2004/0267419 A1 | 12/2004 | Jeng |
| 2005/0021199 A1 | 1/2005 | Zimmerman |
| 2005/0038581 A1 | 2/2005 | Kapolka |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0068417 A1 | 3/2005 | Kreiner |
| 2005/0073585 A1 | 4/2005 | Ettinger |
| 2005/0078423 A1 | 4/2005 | Kim |
| 2005/0083404 A1 | 4/2005 | Pierce |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171663 A1 | 8/2005 | Mittelsteadt |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0205719 A1* | 9/2005 | Hendrickson ....... B61L 15/0027 246/122 R |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0243171 A1 | 11/2005 | Ross, Sr. |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0025907 A9 | 2/2006 | Kapolka |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0158349 A1 | 7/2006 | Oesterling |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |

(56) References Cited

U.S. PATENT DOCUMENTS

| | | |
|---|---|---|
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0259933 A1 | 11/2006 | Fishel |
| 2006/0261931 A1 | 11/2006 | Cheng |
| 2007/0001831 A1* | 1/2007 | Raz .................... B60R 16/0231 340/439 |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0088488 A1 | 4/2007 | Reeves |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1* | 6/2007 | Plante .................... G06Q 10/00 348/148 |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0217670 A1 | 9/2007 | Bar-Am |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0169625 A1 | 7/2011 | James |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |

(56) References Cited

U.S. PATENT DOCUMENTS

| | | |
|---|---|---|
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0065834 A1 | 3/2012 | Senart |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0203402 A1 | 8/2012 | Jape |
| 2012/0210252 A1 | 8/2012 | Fedoseyeva |
| 2012/0269383 A1 | 10/2012 | Bobbitt |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0018534 A1 | 1/2013 | Hilleary |
| 2013/0021148 A1 | 1/2013 | Cook |
| 2013/0028320 A1 | 1/2013 | Gardner |
| 2013/0030660 A1 | 1/2013 | Fujimoto |
| 2013/0046449 A1 | 2/2013 | Yuecel |
| 2013/0048795 A1 | 2/2013 | Cross |
| 2013/0052614 A1 | 2/2013 | Mollicone |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1 | 6/2013 | Lee |
| 2013/0170762 A1 | 7/2013 | Marti |
| 2013/0189649 A1 | 7/2013 | Mannino |
| 2013/0197774 A1 | 8/2013 | Denson |
| 2013/0209968 A1 | 8/2013 | Miller |
| 2013/0274950 A1 | 10/2013 | Richardson |
| 2013/0278631 A1 | 10/2013 | Border |
| 2013/0317711 A1 | 11/2013 | Plante |
| 2013/0332004 A1 | 12/2013 | Gompert |
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0089504 A1 | 3/2014 | Scholz |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0232863 A1 | 8/2014 | Paliga |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2014/0339374 A1 | 11/2014 | Mian |
| 2015/0000415 A1 | 1/2015 | Kelley |
| 2015/0015617 A1 | 1/2015 | Yeo |
| 2015/0035665 A1 | 2/2015 | Plante |
| 2015/0057512 A1 | 2/2015 | Kapoor |
| 2015/0057836 A1* | 2/2015 | Plante ............... B60W 40/08 701/1 |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0156174 A1 | 6/2015 | Fahey |
| 2015/0170428 A1 | 6/2015 | Harter |
| 2015/0189042 A1 | 7/2015 | Sun |
| 2015/0203116 A1 | 7/2015 | Fairgrieve |
| 2015/0022449 A1 | 8/2015 | Salinger |
| 2015/0222449 A1 | 8/2015 | Salinger |
| 2015/0317846 A1 | 11/2015 | Plante |
| 2015/0371462 A1 | 12/2015 | Ramesh |
| 2016/0054733 A1 | 2/2016 | Hollida |
| 2016/0182170 A1 | 6/2016 | Daoura |
| 2017/0301220 A1 | 10/2017 | Jarrell |
| 2018/0025636 A1 | 1/2018 | Boykin |
| 2018/0033300 A1 | 2/2018 | Hansen |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 244694 | 8/2008 |
| GB | 2451485 | 2/2009 |
| GB | 2447184 B | 6/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 9/2013 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0048033 | 2/2000 |
| WO | 0077620 | 2/2000 |
| WO | 0028410 A1 | 5/2000 |
| WO | 0123214 | 4/2001 |
| WO | 0125054 | 4/2001 |
| WO | 0146710 A2 | 6/2001 |
| WO | 03045514 | 6/2003 |
| WO | 2004066275 | 8/2004 |

(56) References Cited

FOREIGN PATENT DOCUMENTS

| WO | 2005095175 | A1 | 10/2005 |
|---|---|---|---|
| WO | 2006022824 | | 3/2006 |
| WO | 2006022824 | A2 | 3/2006 |
| WO | 2007067767 | | 1/2007 |
| WO | 2007109091 | | 9/2007 |
| WO | 2009081234 | | 7/2009 |
| WO | 2011055743 | A1 | 5/2011 |
| WO | 2013072939 | | 5/2013 |
| WO | 2013159853 | | 10/2013 |

OTHER PUBLICATIONS

Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill, 'DriveCam—Faq', Dec. 12, 2003 (3 pgs.).
Bill Siuru, 'DriveCam Could Save You Big Bucks', Land Line Magazine, May-Jun. 2000 (1 pg.).
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/flash/articles/vidtemplate_mediapreso_flash8.html (13 pgs.).
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011 (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011. (20 pg.).
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).
DriveCam, Inc.'s Infringement Contentions Exhibit D, Document 34.4, Oct. 20, 2011. (2 pgs.).
DriveCam—Illuminator Data Sheet, Oct. 2, 2004. (1 pg.).
Drivecam.com as retrieved by the Internet Wayback Machine as of Mar. 5, 2005(1 pg.).
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011. (6 pgs.).
DriveCam Driving Feedback System, Mar. 15, 2004 (12 pgs.).
DriveCam Extrinsic Evidence with Patent LR 4.1 .a Disclosures, Nov. 3, 2011. (1 pg.).
DriveCam Extrinsic Evidence with Patent LR 4.1 .a Disclosures, Nov. 8, 2011. (1 pg.).
Driver Feedback System, Jun. 12, 2001 (1 pg.).
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys- ub.--Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet', Oct. 26, 2001 (2 pgs.).

(56) References Cited

OTHER PUBLICATIONS

International Search Report and Written Opinion issued in PCT/US07/68325 dated Feb. 27, 2008. (10 pgs.).
International Search Report and Written Opinion issued in PCT/US07/68325 dated Feb. 27, 2008. (2 pgs.).
International Search Report and Written Opinion issued in PCT/US07/68328 dated Oct. 15, 2007. (2 pgs.).
International Search Report and Written Opinion issued in PCT/US07/68329 dated Mar. 3, 2008. (10 pgs.).
International Search Report and Written Opinion issued in PCT/US07/68332 dated Mar. 3, 2008. (8 pgs.).
International Search Report and Written Opinion issued in PCT/US07/68334 dated Mar. 5, 2008. (11 pgs.).
International Search Report for PCT/US2006/47055, dated Mar. 20, 2008 (2 pages).
International Search Report issued in PCT/US2006/47042 dated Feb. 25, 2008 (3pgs.).
J. Gallagher, 'Lancer Recommends Tech Tool', Insurance and Technology Magazine, Feb. 2002 (1 pg.).
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infrared Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, 2004, Oct. 3-6, pp. 853-858; Digital Object Identifier 10.1109/ITSC.2004.1399015.
Karen, 'Downloading Options to HindSight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Kathy Latus (Latus Design), 'Case Study—Time Warner Cable', Sep. 23, 2005. (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003 (2 pgs.).
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983) (1 pg.).
Patent Abstracts of Japan vol. 011, No. 292 (E-543), Sep. 19, 1987 (Sep. 19, 1987) & JP 62 091092 A (OK ENG:KK), Apr. 25, 1987 (Apr. 25, 1987) (1 pg.).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987) (1 pg.).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990) (1 pg.).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992) (1 pg.).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993) (7 pgs.).
Patent Abstracts of Japan vol. 1996, No. 09, Sep. 30, 1996 (Sep. 30, 1996) & JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997) (1 pg.).
Patent Abstracts of Japan vol. 1998, No. 02, Jan. 30, 1998 (Jan. 30, 2008) & JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998) (1 pg.).
PCT/US2010/022012, Invitation to Pay Additional Fees with Communication of Partial International Search, Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).

(56) References Cited

OTHER PUBLICATIONS

Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmartDrives Systems, Inc's Production, SO14246-S014255, Nov. 16, 2011 (1 pg.).
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
USPTO Non-Final Office Action for U.S. Appl. No. 14/036,299, dated Aug. 12, 2014. (14 pgs.).
USPTO Non-Final Office Action for U.S. Appl. No. 11/296,907, dated Mar. 22, 2007 (17 pages).
USPTO Non-final Office Action dated Aug. 27, 2009 during prosecution of U.S. Appl. No. 11/566,424 (25 pgs.).
USPTO Non-Final Office Action dated Nov. 27, 2013 in U.S. Appl. No. 13/957,810, filed Aug. 2, 2013. (19 pgs.).

Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
Written Opinion issued in PCT/US07/68328 dated Oct. 15, 2007. (3 pgs.).
Written Opinion of the International Searching Authority for PCT/US2006/47042. dated Feb. 25, 2008 (5 pages).
Written Opinion of the International Searching Authority for PCT/US2006/47055, dated Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.

(56) References Cited

OTHER PUBLICATIONS

USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel OBD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1 .1.02, Jan. 2011, p. 21.
USPTO Non-Final Office Action dated Jan. 4, 2016 in U.S. Appl. No. 14/529,134, filed Oct. 30, 2014 (65 pgs).
PCT International Search Report and Written Opinion for PCT/IB16/51863, dated Sep. 16, 2016 (18 pgs.).
PCT International Search Report and Written Opinion for PCT/US2016/012757 dated Mar. 18, 2016 (11 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.

* cited by examiner

| operator | infraction | speeding | accident | date | miles - ytd |
|---|---|---|---|---|---|
| jones | | | X | 02/04/05 | 845 |
| jones | | X | | 03/04/05 | 1935 |
| jones | X | | | 04/08/05 | 3142 |
| jones | | | | 04/14/05 | 4245 |
| jones | | | | 04/24/05 | 6345 |
| jones | | | | 06/04/05 | 7145 |
| jones | | X | | 06/13/05 | 9847 |
| jones | | X | | 07/14/05 | 10095 |
| jones | | | | 08/04/05 | 12405 |
| jones | X | | X | 09/08/05 | 13734 |
| jones | | | | 10/04/05 | 14845 |

Fig. 2

VEHICLE OPERATOR PERFORMANCE HISTORY RECORDING, SCORING AND REPORTING SYSTEMS

BACKGROUND OF THE INVENTIONS

Field

The following invention disclosure is generally concerned with vehicle operator scoring and reporting and specifically concerned with automated systems which maintain a performance history associated with particular drivers.

Prior Art

The inventions presented in U.S. Pat. No. 6,947,817 by inventor Diem for non-intrusive diagnostic tools for testing oxygen sensor operation relates to a diagnostic system for testing a vehicle where such systems include a wireless communications link between a vehicle any remote network of server computers. In particular, a WiFi type access points allowed an analyzer to communicate by way the Internet with a server computer hosting and oxygen sensor SOAP (simple object access protocol) service. In a nutshell, the system relates to smog sensors for automobiles which communicate with remote servers by way of a WiFi communications links.

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller in nonvolatile memory, and an accident sensing interrupter. The oldest memory is overwritten by the newest images, until an accident is detected at which time the memory is blocked from further overwrites to protect the more vital images, which may include important information about the accident. Mr. Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in to U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interface.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'Drive-Cam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Remote reporting and manipulation of automobile systems is not entirely new. The following are very important teachings relating to some automobile systems having a wireless communications link component.

Inventors Fan et al, teach inventions of methods and systems for detecting vehicle collision using global positioning system GPS. The disclosure of Jun. 12, 2001 resulted in granted patent having U.S. Pat. No. 6,459,988. A GPS receiver is combined with wireless technology to automatically report accident and third parties remotely located. A system uses the GPS signals to determine when an acceleration value exceeds the preset threshold which is meant to be indicative of an accident having occurred.

Of particular interest include inventions presented by inventors Nagda et al., in the document numbered U.S. Pat. No. 6,862,524 entitled using location data to determine trafficking route information. In this system for determining and disseminating traffic information or route information, traffic condition information is collected from mobile units that provide their location or position information. Further route information may be utilized to determine whether a mobile unit is allowed or prohibited from traveling along a certain route.

A common assignee, @Road Inc., owns the preceding two patents in addition to the following: U.S. Pat. Nos. 6,529,159; 6,552,682; 6,594,576; 6,664,922; 6,795,017; 6,832,140; 6,867,733; 6,882,313; and 6,922,566. As such, @Road Inc., must be considered a major innovator in position technologies arts as they relate to mobile vehicles and remote server computers.

General Motors Corp. teaches in U.S. Pat. No. 6,728,612, an automated telematics test system and method. The invention provides a method and system testing a telematics system in a mobile vehicle a test command from a test center to a call center is based on a test script. The mobile vehicle is continuously in contact by way of cellular communication networks with a remotely located host computer.

Inventor Earl Diem and Delphi Technologies Inc., had granted to them on Sep. 20, 2005, U.S. Pat. No. 6,947,817. The non-intrusive diagnostic tool for sensing oxygen sensor operation include a scheme or an oxygen analyzer deployed in a mobile vehicle communicates by way of an access point to a remotely located server. A diagnostic heuristic is used to analyze the data and confirm proper operation of the sensor. Analysis may be performed by a mainframe computer quickly note from the actual oxygen sensor.

Similar patents including special relationships between mobile vehicles and remote host computers include those presented by various inventors in U.S. Pat. Nos. 6,735,503; 6,739,078; 6,760,757; 6,810,362; 6,832,141; and 6,850,823.

Another special group of inventions owned by Reynolds and Reynolds Holding Inc., is taught first by Lightner et al, in U.S. Pat. No. 6,928,348 issued Aug. 9, 2005. In these inventions, Internet based emission tests are performed on vehicles having special wireless couplings to computer networks. Data may be further transferred to entities of particular interest including the EPA or California Air Resources Board, for example, or particular insurance companies and other organizations concerned with vehicle emissions and environment.

Other patents held by Reynolds and Reynolds Holding Inc., include those relating to reporting of automobile performance parameters to remote servers via wireless links. Specifically, an onboard data bus OBD system is coupled to a microprocessor, by way of a standard electrical connector. The microprocessor periodically receives data and transmits it into the wireless communications system. This information is more fully described in U.S. patent granted Oct. 21, 2003 U.S. Pat. No. 6,636,790. Inventors Lightner et al, present method and apparatus for remotely characterizing the vehicle performance. Data at the onboard data by his periodically received by a microprocessor and passed into a local transmitter. The invention specifically calls out transmission of data on a predetermined time interval. Thus these inventions do not anticipate nor include processing and analysis steps which result in data being passed at time other than expiration of the predetermined time period.

Reynolds and Reynolds Holding Inc., further describes systems where motor vehicles are coupled by wireless communications links to remote host servers in U.S. Pat. No. 6,732,031.

Additionally, recent developments are expressed in application for U.S. patent having document number: 2006/0095175 published on May 4, 2006. This disclosure describes a comprehensive systems having many important components. In particular, deWaal et al presents a 'crash survivable apparatus' in which information may be processed and recorded for later transmission into related coupled systems. An ability to rate a driver performance based upon data captured is particular feature described is some detail.

Also, inventor Boykin of Mt. Juliet Tenn. presents a "composite mobile digital information system" in U.S. Pat. No. 6,831,556. In these systems, a mobile server capable of transmitting captured information from a vehicle to a second location such as a building is described. In particular, a surveillance system for capturing video, audio, and data information is provided in a vehicle.

Inventors Lao et al, teach in their publication numbered 2005/0099498 of a "Digital Video System-Intelligent Information Management System" which is another application for U.S. patent published May 12, 2005. A digital video information management system for monitoring and managing a system of digital collection devices is specified. A central database receives similar information from a plurality of distributed coupled systems. Those distributed systems may also be subject to reset and update operations via the centralized server.

Finally, "Mobile and Vehicle-Based Digital Video System" is the title of U.S. patent application disclosure publication numbered 2005/0100329 also published on May 12, 2005. It also describes a vehicle based video capture and management system with digital recording devices optimized for field use. Because these systems deploy non-removable media for memory, they are necessarily coupled to data handling systems via various communications links to convey captured data to analysis servers.

SUMMARY OF THE INVENTIONS

Comes now, James Plante, Gregory Mauro, Ramesh Kasavaraju and Andrew Nickerson with inventions of vehicle operator performance history recording and reporting systems including devices and methods of automatically collecting and processing data over time to form a driver history report comprising performance information collected over a discrete time period.

Vehicle event recorders arranged to capture data relating to a particular event are additionally coupled to a system which forms an association between collected data and the vehicle operator. These systems further provide means for long-term storage of data relating to particular operators and events. Special recall operations executed against data stored as described, permits compilation of an operator performance report including a single value performance score. The single value operator performance score is indicative of a vehicle operator's performance and safety history.

A special system is provided to connect and associate collected data to the operator responsible for triggering an event. Once an appropriate association is made, information is kept in long-term storage where it may be joined by data from events occurring at a later time. An analyzer system operates to recall data, particularly data from a plurality of events all associated with a single operator but recorded over an extended period of time. Data is arranged in a manner such that algorithms and other mathematical analysis may be applied independently to various data elements or "fields" to produce performance metrics and ratios. Together, these factors may each be weighted and summed in accordance with specially devised a formulae including those having a single value solution. In best versions, this performance score may be normalized to a value between one and zero, where values closer to one represent the best operators enrolled in the program and values nearer zero reflect those operators of lowest performance. Thus, these systems provide a highly useful metric which quantifies operator performance history.

OBJECTIVES OF THESE INVENTIONS

It is a primary object of these inventions to provide advanced recording and reporting systems for motor vehicle exception events.

It is an object of these inventions to provide automated vehicle operator performance measure, recording and reporting systems.

It is a further object to provide automated vehicle operator performance tracking and history systems.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

FIG. 2 is a brief example collection of datasets to illustrate associations with a particular operator;

GLOSSARY OF SPECIAL TERMS

Figure 1:
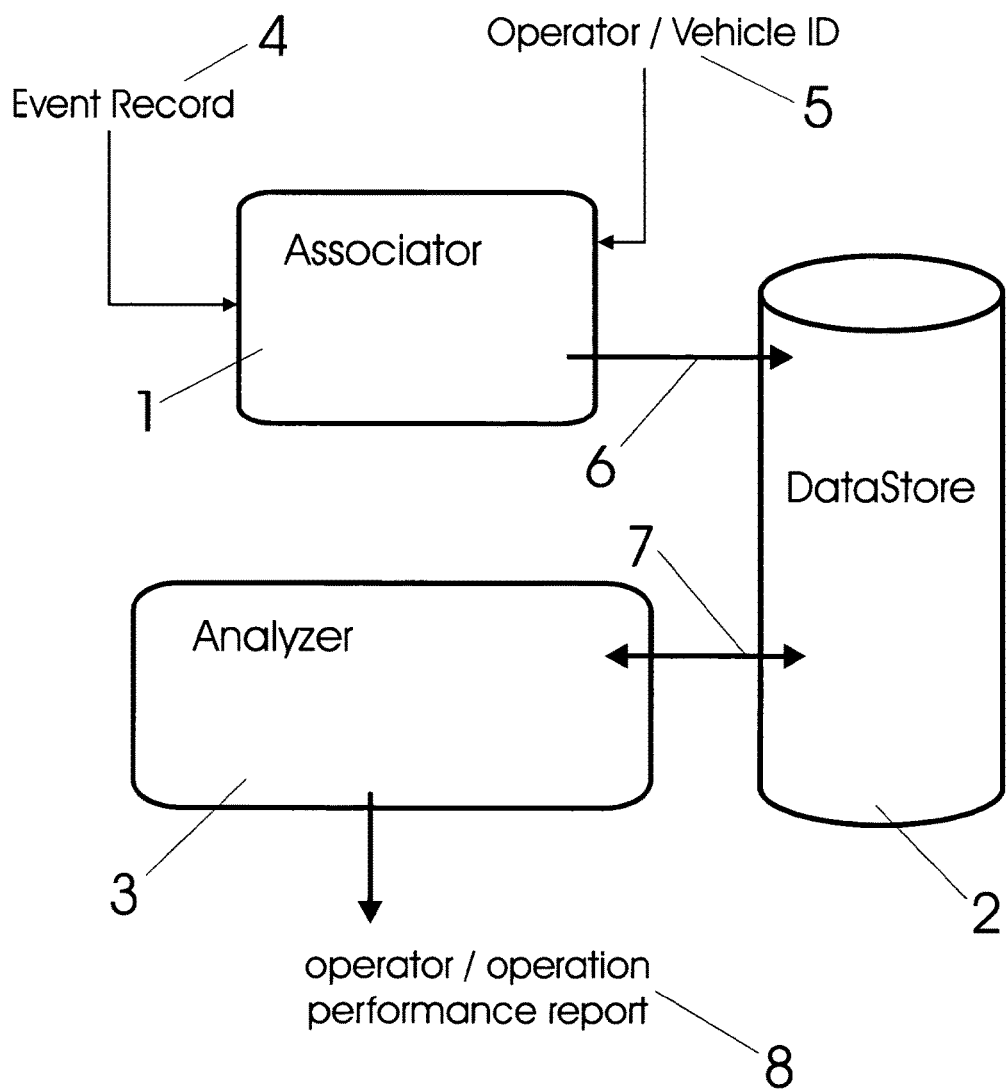
FIG. 1 is top-level block diagram to illustrate system primary elements.

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must use the context of use and liberal discretion to arrive at an intended meaning. One will be well advised to error on the side of attaching broader meanings to terms used in order to fully appreciate the depth of the teaching and to understand all the intended variations.

Vehicle Event Recorder—VER

A vehicle event recorder is an electronic instrument coupled to an automobile and its environments to capture data in response to a detected exception or prescribed condition or 'event'.

Vehicle Operator

The terms: 'operator', 'vehicle operator', or 'driver' herein means a person who operates or has operated a motor vehicle—for purposes of these inventions, a vehicle operator has one and only one unique identifying code associated therewith.

Event

An exception event occurs in a discrete time period surrounding detection of a prescribed condition. An exception event is declared upon toggle of a trigger mechanism which may be coupled to manual or automatic means of activating the trigger mechanism. An example of an exception event of particular interest, a vehicle involved in a crash subject high impact forces causes an accelerometer type trigger to be toggled resulting in a data capture action where data collected both before and after the event is captured and stored.

Event Record

An 'event record' is captured data associated with a particular event relating to the use and performance of an automobile including video and discrete numeric data. Event Record Dataset An event record dataset is a combination of an event record, a vehicle operator identifier and an association between the two.

Report

A report is an output compiled from information stored in time from a plurality of exception events captured separately over an extended period.

Single Value Score

A single value score is a vehicle operator performance parameter or metric expressed numerically as a single value.

PREFERRED EMBODIMENTS OF THESE INVENTIONS

In accordance with each of the preferred embodiments of these inventions, apparatus for and methods of providing vehicle operator performance history recording and reporting are provided. It will be appreciated that each of embodiments described include both apparatus and method and that the apparatus and method of one preferred embodiment may be different than the apparatus and method of another embodiment.

Vehicle event recorders are arranged to capture video and discrete numeric data associated with a specific exception event in connection with a trigger; the captured video relating in-part to vehicle and driver performance. A vehicle event recorder also captures vehicle systems status information similarly in connection with a triggered event. Together, these data form an 'event record', which is effectively a detailed documentation of conditions relating to the nature of the event.

While a vehicle event recorder may include digitized and system status information, the data is not otherwise associated or connected with any vehicle operator. That is, an event record does not include attachment to the vehicle operator. Vehicle event recorders and their associated processing systems heretofore have not included automated means of identifying a unique driver. In some versions, event recorders of the arts may include one or more images of a driver, images from which a driver identity might be taken in a mental step process, i.e. a human recognition process, event recorders otherwise contain no discrete identity information with respect to operators.

In the systems first presented, a system component is an associator arranged to receive event records, further to receive discrete identity information from an operator ID system, and to form an association between the two thus connecting and enjoining them as an event record dataset. The associator, then transmits the dataset to a database for long-term storage. An analyzer may query the database to fetch select records in accordance with a particular request design. In some preferred versions, such requests may come from a user interface which permits human configuration of such requests.

Datasets/resultset may be recalled and transmitted from the database to the analyzer which includes an algorithm library. These datasets/resultset are formed of many elements or sometimes "data fields". Algorithms may include mathematical operations which operate with regard to a particular data field or fields to produce a desired output. For example, when a group of datasets are recalled each having the same operator as defined by the operator ID, an algorithm may be applied to make a determination as to driving performance with particular regard to a specific vehicle operator. A group of data sets, all relating to a different event associated with the same driver can be analyzed for speed violations in example. It may be determined for example, that a particular driver had three speed violations during the last month. A report to reflect such a determination is prepared as an operator performance measure.

The system is comprised of the primary elements including: and associator; a database; and an analyzer. The associator receives as input event records and vehicle operator identification information. The associator forms an association between these data elements. Operator identification information which identifies a "current operator", i.e. the operator who is operating the vehicle at the time of the occurrence of a declared exception event. Event record information is produced as a result of the event having occurred. Thus, it is some instant in time which connects a vehicle operator with captured event data. The associator forms the event record dataset and transmits that dataset as output to a database with which it is in communicative relation.

The database is arranged to receive event record datasets in a form which contains information about the physical nature of a vehicle and its environment during an event; information about driver/vehicle identity; as well as an association between these information records, whereby precisely one driver identity is associated with each event. The database is further arranged to provide output in response to requests or queries from exterior data consumers. Responses may be provided whereby a search filtered on specific indices produces a resultset comprising a plurality of datasets with a common factor; for example a unique vehicle operator. In this way, the database may provide a resultset to an analyzer of all events having an association with a specific driver. Of course other result sets of various specification are similarly arranged.

An analyzer is communicatively coupled to a database whereby it may make queries or requests for information and further receive data provided as database responses. The analyzer is provided with means to process received data to form statistical results. The analyzer might apply select algorithms to received data, the algorithms operating on specific elements of the datasets to yield a mathematical conclusion.

Thus, an associator is arranged to: receive event records; receive identification information; to form an association therebetween this forming prescribed data sets; and further to transmit those datasets to a database of suitable structure. The database is arranged to pass resultsets to an analyzer which applies various analysis in producing a statistical representation of a plurality of associated events. These are the primary elements of preferred versions of these systems.

While the preceding description presents in detail some important key elements and their relationships with others, important minority elements are also present and arranged to cooperate with those key elements as well as other minority elements. Minority elements include: operator/vehicle identification systems; vehicle event recorders; vehicle systems sensors and transducers; event trigger; user interface; algorithm library; operator performance measure reports; and finally an operator performance coefficient.

In these systems, some preferred versions include means of conveyance of vehicle operator identity. Vehicle operator identity must first be discretized and further must be unique with respect to each person authorized to operate suitably equipped vehicles. While persons in a room, each being familiar with the other, may identify which of the others is "Fred", such human recognition is a straightforward operation for the human mind—but providing unique identities of persons in computer systems demand a bit of overhead. A discrete value identity code assignment is made for each valid operator. When an operator initiates use of a vehicle, an operator ID system determines the identity code associated with the operator and provides if to the associator.

In some preferred implementations, operator ID systems include a tactile input which permits users to express their identity by a key pad entry. Once a user keys in his/her code, the operator identity system can thereafter report accurately to the associator who is operating the vehicle. Events occurring during periods following ID entry can be properly allocated to the actual operator of the vehicle. Other operator ID schemes may be deployed in alternative versions of operator ID systems. In one such alternative, a scheduling program may assign a particular driver a particular vehicle on a certain day and at a certain time report the assignment to the operator ID system which then passes the ID info into the associator as it receives event records. Accordingly, some operator ID systems are "on-board" and some are "off-board". While in some preferred versions it is anticipated that an operator ID system will be established as an on-board integrated with a vehicle event recorder; it is important to point out that this is entirely possible to create an alternative where the operator ID system is instead deployed as a subsystem exterior to the vehicle and vehicle event recorder.

An event record dataset is prepared by the associator for long-term storage in a database. An event record dataset includes an event record; an operator identifier and sometimes a vehicle identifier; and an association therebetween. As soon as event record data is joined with an operator/vehicle identifier, it is an event record dataset for purposes of this disclosure.

Since an event record arises from a single event in which only one operator may be on station, there exists a certain 'one-to-one' correspondence between any vehicle operator and any single event record. However many event record datasets may be compiled over time and each of those may include the same operator. So, there is a 'one-to-many' relationship between any vehicle operator and the event record datasets which may be stored in a database. In fact, an event record dataset only comes into existence as a result of an event having occurred and in these systems it is preferred that for each event which occurs, an event record dataset is formed.

An analyzer further includes an algorithm library. An algorithm library is stored set of algorithms which may be selectively invoked and applied to a group of datasets. Algorithms may be applied individually, or may be applied serially one after another. A properly arranged algorithm applied to a select group of datasets can yield a performance metric result. In best versions, an operator performance measure output is generated as a result of an algorithm being applied to a select group of datasets. And operator performance measure may include statistical compilation and presentation of data analysis which reflects performance with regard to particular operator, group of operators, vehicle or group of vehicles.

An operator or vehicle performance report O/V-PR is a report containing statistical information regarding the performance of a vehicle operator or vehicle operation. An operator performance report is an output from an analyzer which applies any of a prescribed group of algorithms to a plurality of event record dataset records; those datasets having been created over some extended period of time. Thus an O/V-PR is and historical account of events having occurred with particular connection to a certain driver or vehicle. Exception events which may occur from time-to-time result in production of data describing and documenting the event. Those data are associated with a particular operator identity and stored over time. An analyzer applies certain algorithms to data recalled from memory to produce a statistical report; an O/V-PR is therefore a compilation of analyzed data to produce results which expresses the historical nature of a vehicle operator's or vehicle's performance. An O/V-PR may be based upon all events captured over a specified period of time and is sometimes comprised of a plurality of weighted factors.

FIG. 1 illustrates an example arrangement of major system components from which these systems are formed. In brief, these systems are primarily comprised of an associator 1, connected via communications link to computer based relational database 2, further in communications with an analyzer 3 implemented as a computer system. The associator is arranged to receive an information package formed as an event record 4, as well as operator identification and sometimes vehicle identification information. Upon receipt of these information elements, the associator forms an association between them to effect an event record dataset. A single data record is formed in a structure which preserves the association between the event record and the operator/vehicle identification information and which further supports storage and manipulation by relational database type computing and storage systems. These arrangements of information may be embodied as a dataset which is assigned an 'index' or 'key' value to further assure and maintain the integrity of the information collection as a single unit. An analyzer is in two-way communication 7 with the database such that it can run queries against data stored therein and receive resultsets after those queries are executed. Finally, the analyzer is arranged to assemble process and analyze results received from the database and to output an operator performance measures to external systems.

A vehicle event recorder captures data relative to the operational states of vehicle subsystems as well as video images of environments about a vehicle while in use. Operational states of a vehicle may be reported to the vehicle event recorder by way of an on-board diagnostics system OBD which maintains monitoring of vehicle subsystems by various sensors so arranged. Data is captured upon detection of a special circumstance or unusual condition. A trigger may be devised to detect an unusual physical condition such as heavy shock or excessive speed. Upon detection of the condition, the trigger declares an exception event and initiates a data capture operation. An exception event is declared and the data capture action is performed during a brief time around the declared event moment. This captured information is connected with the particular vehicle operator authorized to use the vehicle at the time the information is captured by way of an operator identity code. Together, this information is stored at the database as a single information unit or 'record'.

While it is possible to perform limited analysis on single event records, the true value of these systems is only realized when a plurality of events are analyzed via mathematical relationships which are applied to common elements (fields) between separate records captured at various times. That is, a first event record is stored in the database until another independent event occurs and that event record data is also added to the database. Under such circumstances, certain algorithms become very useful in expressing the performance quality of a particular operator of a vehicle or operators of a fleet of vehicles. A database may be arranged to receive records for many different operators, different vehicles, and even different fleets. When analysis is performed, records may be sorted and included/excluded from analysis on the basis of many considerations embodied as data fields.

FIG. 2 is provided to illustrate a database grid comprising 11 separate dataset records each associated with an exception event occurring at a different time. All 11 records are associated with a unique vehicle operator 21 identified as "Jones". The event data records illustrated include information relating to whether an infraction 22 is involved, whether it is a speeding 23 case, and whether the event involves an accident 24. In addition, the date 25 of the event is recorded and a 'miles-year-to-date' 26 numeric value is included as part of the dataset. The data grid presented is for illustration purposes only and the reader will readily understand that any real system would certainly include many more data fields which contribute ultimately to the expression of an operator performance measure. For example, detailed speed data, braking and acceleration measurements, engine speed, steering position, et cetera. These factors and many others are omitted from the diagram to avoid a crowded illustration, but are explicitly meant to be included as part of any high performance system.

For this example, each record belongs to the vehicle operator named 'Jones' 27. A binary indication 28 marks the record capture on Jul. 14, 2005 as one in which an exception event is characterized as including a speeding incident. The event record captured Jul. 8, 2005 includes data 29 which indicates the event was classified as an 'accident'. An event record of these example systems preferably includes date and mileage information which is useful for providing 'related rate' type performance measures. For example, we can use two separate event records 210, applying subtraction analysis therebetween to conclude that Jones has committed to speeding violations in a 31 day period. Another way to express Jones' performance with regard to speeding is to consider that mileage in computing a "speeding infractions per mile" measure, we can say that Jones has attracted two speeding violations in 248 miles or approximately equivalent to 0.8 violations per hundred miles. Of course, if we consider Jones' entire recorded history, we can figure Jones makes 0.02 speeding violations per hundred miles or: (3×100/14845). These illustrate very simplified mathematical analysis between related (by operator) event record data which express a driver performance measure.

It is important to direct attention to the automated nature of these systems. While it may not be precisely novel to merely compute "violations per mile" in connection with some particular vehicle operator, these systems stand alone and in stark contrast as they are based upon automated collection of event data in response to a triggered exception event and automated association of the captured data and the identity of operators to which it belongs. Further, these systems are based upon analysis which may be applied to so captured organized and stored data to yield a vehicle operator performance measure which expresses the quality of a vehicle operator. All systems not having vehicle mounted trigger event data capture devices, rely on manual manipulation and management of information to arrive at similar descriptions of driver performance. Presently one need only visit the local Department of Motor Vehicles to receive a computerized record of driving performance from data stored this way. However this record of driving performance is not compiled from automated systems which connect user identity with data captured in real-time on a vehicle mounted system.

Figure 3:
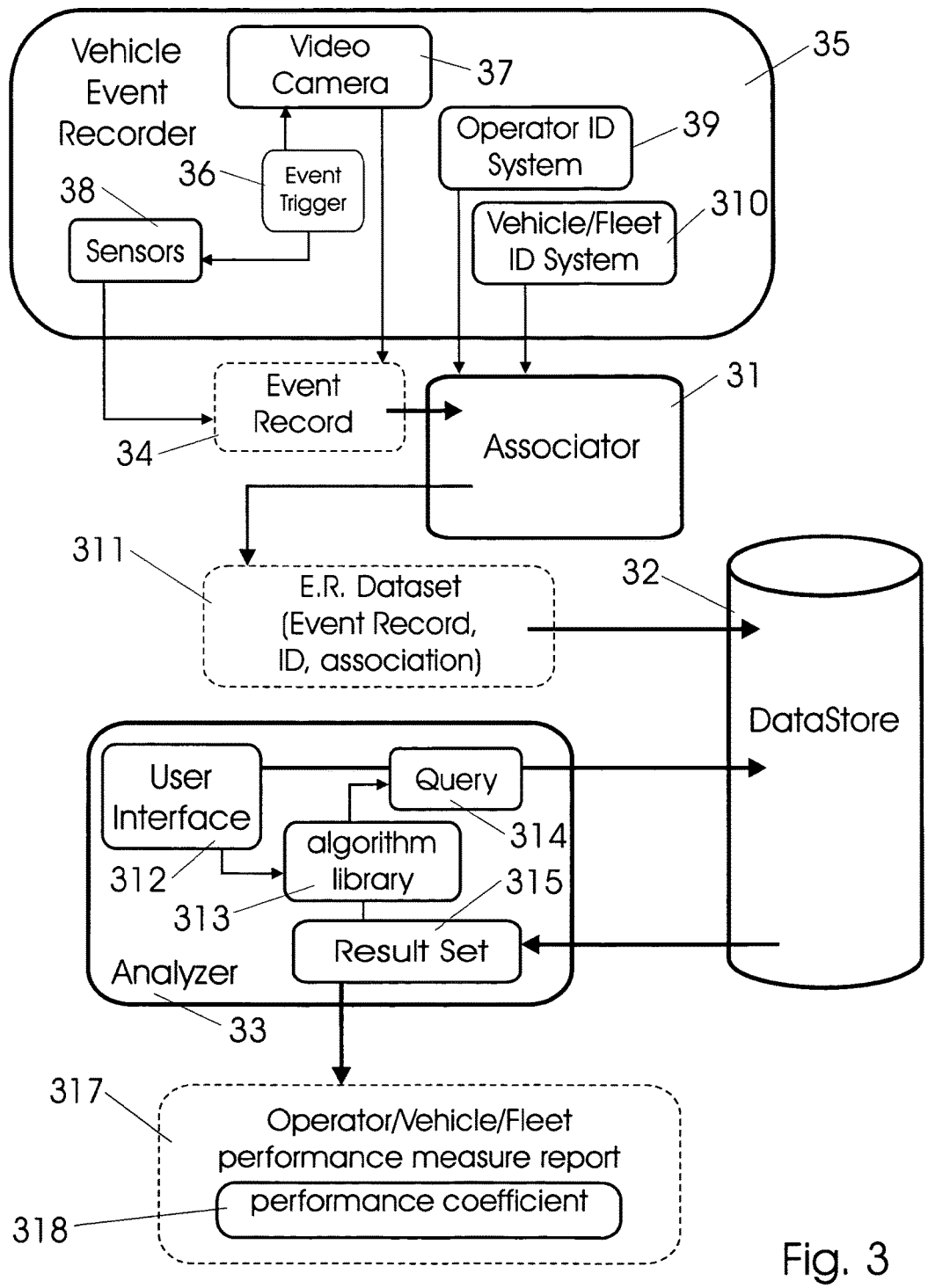
FIG. 3 is detailed block diagram further setting forth important elements of apparatus of these systems.

Better appreciation is realized in a further consideration of the block diagram illustrated as FIG. 3. An associator 31 is coupled to a database 32 and analyzer 33 as shown. The associator is connected to receive event records 34 from a vehicle event recorder 35. When an event trigger 36 fires, an exception event is declared and data is captured by the vehicle event recorder, particularly: camera 37, and various vehicle subsystems coupled sensors 38. Captured data is assembled together to form an event record including both discrete numeric data and non-discrete data for example video image series. In addition to receiving event records from time-to-time, an associator also is coupled to a vehicle event recorder to receive operator identity information and sometimes vehicle identity information. An operator identity system 39 is provided to pass a unique identifier which is assigned to precisely one single vehicle operator to the associator. In some versions a vehicle identity system is similarly devised to pass vehicle identity information to the associator. The associator thereafter effects a connection or association between received event record and vehicle operator identity to perfect an event record dataset. An event record dataset 311 is comprised of event record data, operator and/or vehicle identity information, and association therebetween the two. As such, this information is passed into a data storage system configured as an electronic relational database. The event record dataset may be inserted into the database and created as a new record having an index value assigned thereto which assures the record can be distinguished from any other which may arrive later or has already arrived in the database.

In some best versions, and analyzer may include a user interface 312 which might be used to call prepared algorithms from a library 313 or alternatively might be used to manually form queries 314 which can be run against data stored in the database. Alternatively, procedures may be embodied as "stored procedures" in the database may be called by the analyzer in response to user inputs received at the user interface. Upon successful execution of a query or stored procedure, a resultset 315 is passed back to the analyzer. A resultset can be used to drive external systems. In a first instance, a result set can be used in a simple report 317 which expresses an operator performance measure. Just as financial and credit worthiness of us all are measured via a so called 'FICO' score, these systems will permit professional drivers to be easily measured and associated with a running single-value performance score or measure. Of course the systems will be adopted early by professional fleets and their employees, however it is entirely possible that all permitted drivers will soon benefit from these systems which operate to measure vehicle operator performance.

Output results (resultsets) may also be compared to a prescribed threshold value in an external system which takes an action based upon values arrived at in these resultsets. When an operator performance value or coefficient 318 exceeds a prescribed limit, an action may be set into motion. For example, if the driver performance value falls below some predetermined level, a driver may be subject to a counseling session. Thus, these resultsets can be used to automate a program of driver education and guidance in response to poor driving as detected in a vehicle event recorder.

Figure 4:
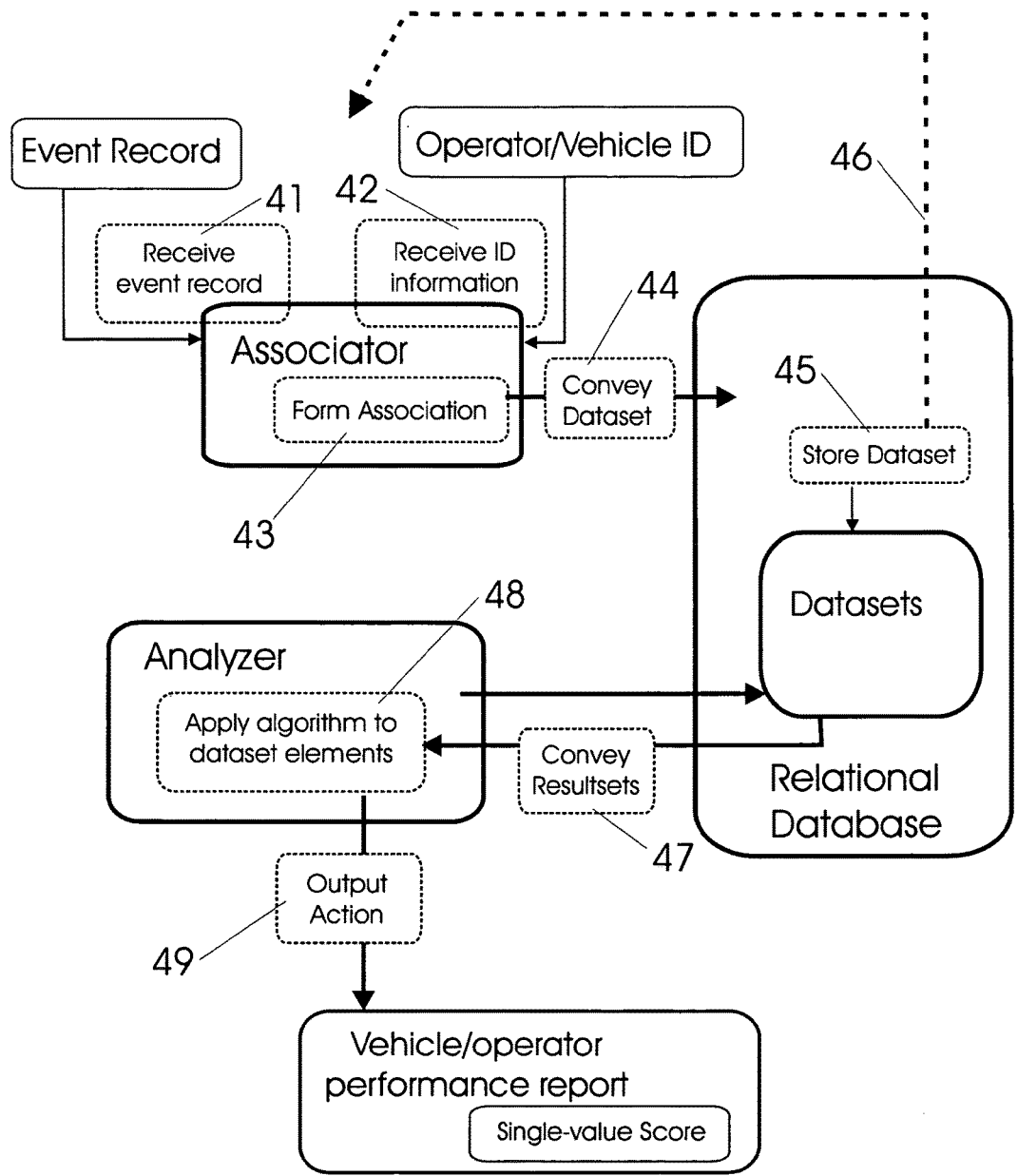
FIG. 4 illustrates in block diagram fundamental methods of these systems.

Methods of these systems are similar in nature. They are nicely illustrated by block diagrams of FIGS. 4 and 5. In a first process, an associator is arranged to receive an event record 41. From a coupled vehicle event recorder in response to a triggered event, data captured during the event is passed to the associator. The associator further is connected to systems which provide identity indication with respect to vehicle operators and/or vehicles, and identity information is received 42 accordingly. In possession of data described, an association is formed 43 to connect the captured data which characterizes the event to the vehicle operator who was operating the vehicle at the time of the event declaration. A machine processable identity code for example is joined with the video and other data to form a complete event record dataset. A event record dataset is then in proper form to be conveyed 44 to a relational database system. In a process step, the associator in communication via prescribed database interfaces with the database system, conveys an event record comprising: event data, operator/vehicle identity information, and an association therebetween. The database system receives event record datasets from the associator and stores 45 them in durable memory. A relational database provides indexing means to assure record integrity and these event record datasets are handled in this manner. Each received event record data set is automatically assigned a unique identifier which maintains a connection between all fields or data elements of the record. While the data is in storage and under safekeeping at the database, a process loop 46 resets the vehicle event recorder to receive and convey additional event record datasets not related in time to the earlier received conveyance.

A database system in communicative relation with an analyzer conveys 47 resultsets to the analyzer for application of algorithms and mathematical analysis 48. In some preferred versions, the analyzer sends queries into the database system or calls stored procedures therein which may be executed to produce highly directed results sets. A final process may be initiated where an output action 49 is taken. In a simple first example of an output action, a report is produced where the report includes an operation performance measure. Another example includes that where an external system is prompted to begin. If a performance measure exceeds a prescribed value, a call to the external system is made as a result. This may be as simple as sending an e-mail warning via an electronic mail server (i.e. the external system).

Figure 5:
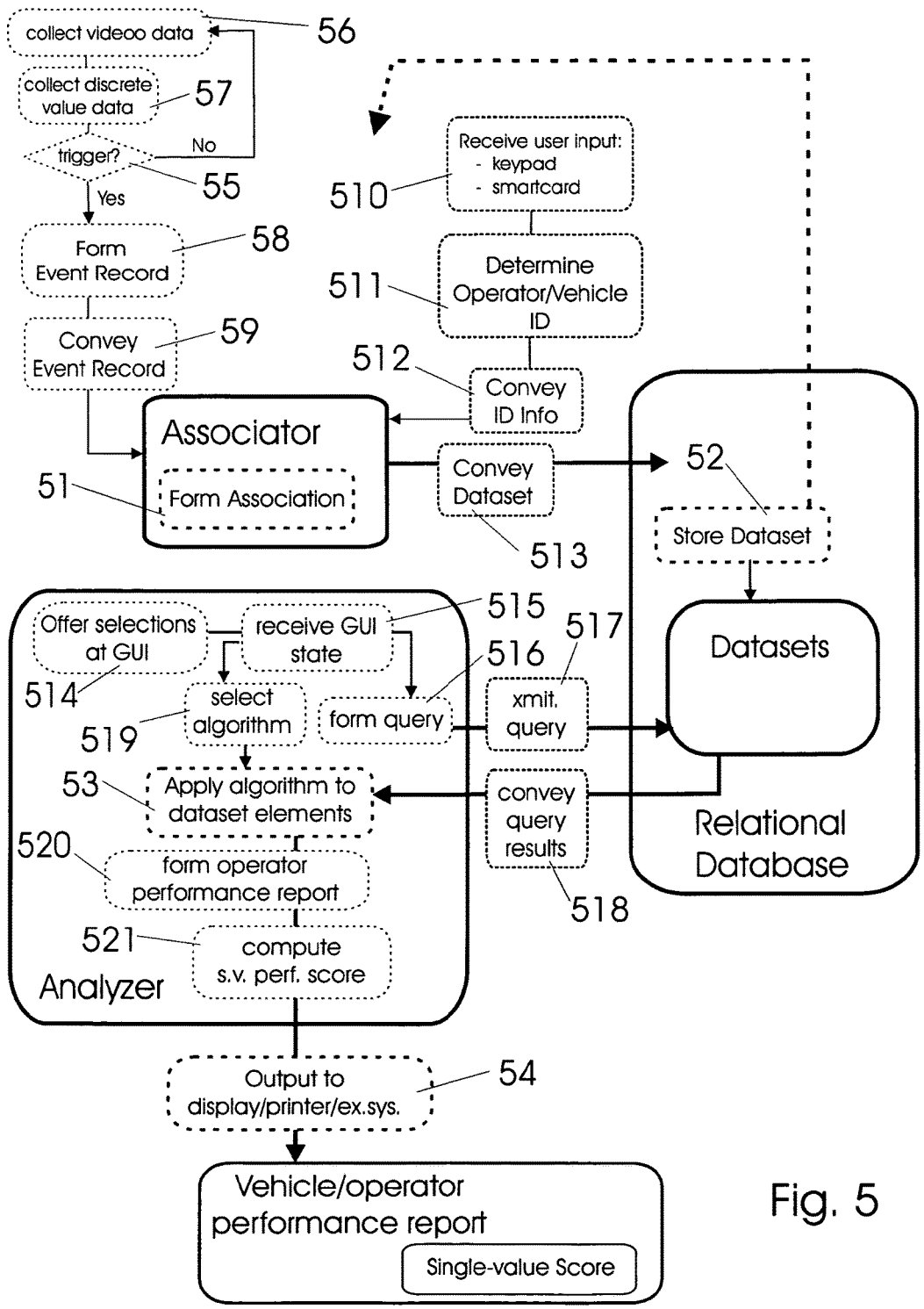
FIG. 5 illustrates in further detail some preferred methods.

FIG. 5 illustrates these methods in more detail. And associator forms an association 51 between event data including video and numeric data captured to characterize an exception event in a motor vehicle. The event record dataset is stored 52 with a unique identifier via an index scheme whereby the data can be sorted and processed as distinguishable from all similar records. To a collection of event records so stored in the database mathematical analysis may be applied 53 to produce an output 54 to a display, printer or other external system.

The method starts in response to an event trigger 55 of a vehicle event recorder which indicates the occurrence of an exception. In response thereto, video data is preserved 56 from periods before and after the event moment. In addition, discrete value data is also collected 57 from the electronic detectors coupled to vehicle subsystems. Data which characterizes the event is assembled together as an information packet to form an event record 58. The event record is passed 59 to the associator. Aside from this process, additional information is prepared and passed into the associator. In some versions, a user input is received 510 for example at a login keypad or smartcard reader, that user input specifying an authorized operator identity. A coded input prearranged with an association to a particular vehicle operator is received to alert the system as to the identity of the driver. An authorization check 511 may be used to verify a valid code. The current vehicle operator identity is conveyed 512 to the associator any time an event occurs such that it may be appropriately combined with and connected to the event data. The associator modifies the event record by adding operator and sometimes vehicle identity information thus forming an association therebetween to form an event record dataset. The dataset is arranged in a form suitable for cooperation with relational database structures including data type and indices considerations such that when conveyed to the database via an "insert" operation, the data is placed in table(s) as one of a plurality of similarly arranged records. The preceding portion of the method may be executed repeatedly in a loop to effect capture of many event record datasets that each have its own association with a particular single.

The method continues with the steps where analysis of collected data is applied. An analyzer is arranged to read database records and process them to arrive at a result which is based upon the information contained therein especially as it applies to a particular vehicle operator. The system is extremely powerful in-part because it can consider a plurality of event records each associated with a different event but identical operator. Accordingly, these analysis yield valuable performance indicators which relate to a vehicle operator.

In preferred embodiments, and analyzer includes an administrator workstation having a graphical user interface 514 whose state as manipulated by the administrator controls 515 how the analysis is taken up. A database query is formed 516 and transmitted 517 over a communications link to the database where the query may be applied against the stored data. After execution of the query, the database produces a resultset and conveys 518 that back to the analyzer as a query response.

From the input at the administrator database, an appropriate algorithm is selected 519 and applied to the resultset to further process the data. One important aspect includes forming an operator performance report 520 which reflects the quality of performance by a single or selected group of vehicle operators. In addition to a compound report which may include many separate factors, a single value performance score is computed 521. Separate performance measures are combined via weighted coefficients to arrive at a normalized single-value score. The score is particularly valuable because it is easily standardized and permits a relative basis upon which all participating drivers may be accurately compared. For example, highest performance driver in the system may be assigned a score of 1 and all others some value between 1 and 0 to reflect their performance in relation to the system the universe of operators.

A vehicle operator performance measure may be provided by a system having an associator; a data store; and an analyzer. The associator 'connects' or forms an association between event records and an operator identity as part of a dataset which is transmitted to the data store. An analyzer is arranged to apply mathematical processing and analysis against stored datasets to produce a vehicle operator performance measure.

In a vehicle event recorder, an exception event results in the capture of information which may be used to characterize the event and status of the vehicle and operator. Once information relating to a particular event is captured, that information is associated with a particular vehicle operator to form a dataset suitable for long term storage in a database. Events taking place at a later time which might be similarly stored, may include the same vehicle operator. As such, it is possible to run a statistical analysis on all events associated with a particular vehicle operator and to draw performance algorithms which yield a performance measure type result. For example, a first performance measure might simply include the number of events occurred per mile driven. Another performance indicator might be number of crash type incidents per mile driven. An more complex algorithm might include both of these measures and a weighting factor for each. For example: performance measure=(Events/Mile)*3+(Crashes/Mile)*8; where 3 and 8 are weighting factors.

As such, an associator is a subsystem arranged to form a connection between information captured in an event and information which uniquely identifies a vehicle operator; namely the vehicle operator responsible for the vehicle at the time of the event—a logged on driver. An associator comprises a logic processor arranged to receive both event data information and operator identity information and to assemble that information according to protocol demanded at a database. A database record structure having a one-to-one correspondence between events and vehicle operators is an example of an enforced relationship in such record structures prepared by an associator.

An analyzer is provided with a priori knowledge of these data structures such that it might execute machine operations against stored data which effect analysis on several event records; each of which may be associated with a particular vehicle operator or vehicle operator group. An analyzer might include: a graphical user interface; a query facility; and an algorithm library as part of its subsystems. The graphical user interface can be arranged to: receive inputs from a user; to drive query formation in agreement with received inputs; and further to select algorithms from the algorithm library. In this way, an analyzer reads and processes stored event data to formulate a result which is a vehicle operator performance measure.

These systems for producing a vehicle operator performance measure may include a set of electronic transducers coupled to various of the vehicle environments and systems to capture information relating to vehicle operation or performance. Outputs from these electronic transducers are assembled together in an 'information package' together as event records which may be taken up by the associator. By example, these sensors may include any of those from the group: imager; accelerometer; speedometer; position; orientation; time; and any of standard vehicle systems status indicators including: engine speed, temperature; braking; gear ratio; and steering wheel position.

In addition to these electronic transducers, a system also includes an operator identity system to make discrete and provide an indication which expresses a vehicle operator's identity. The expression of a vehicle operator's identity may be conveyed from the operator identity system to the associator where that identity indicator may become associated with various event data.

In a more complete sense, these systems are considered to also include the vehicle event recorder which has at least one imager, memory; and an event trigger. This vehicle event recorder being arranged to produce event records in response to a toggle action of an event trigger. Toggle of the event trigger not only causes information from said sensors to be captured, but also to be further associated with a particular vehicle operator identity.

In best versions, an operator identity system includes a memory with stored values each associated with at least one particular vehicle operator. An operator identity system may be at least partly integrated with a vehicle event recorder; or in contrast may be implemented in part at a download server.

This invention disclosure also includes methods. In particular, these methods may be expressed in general terms as including the following steps. A 'receiving an event record' step where a vehicle event recorder captures information relating to a declared exception event, i.e. in response to a trigger; for example a video record of environments about a subject vehicle and sensor data relating to a vehicles systems. A 'receiving identity information' step is performed where a discrete indication of a particular vehicle operator, or a unique identifier assigned to a particular vehicle or vehicle fleet, is received at an associator where the associator performs the next step.

A 'forming an association' step connects the event record with received vehicle operator identity information thus forming a dataset record having: event record, identity information, and the association therebetween. A well-formed database record might include: event record information, identity information, and an association therebetween. The database record includes a plurality of field elements, each field element having a prescribed data type and value assigned thereto, the values reflecting information received as an event record and identity information.

Further, the methods include storing the dataset record in a database for long term storage. Ideally, for a term long enough where other event records are also added to the database. Each dataset record has information from an event record captured at a time different than the capture time of all other dataset records.

Dataset records are recalled in a query step where they may be sorted and selectively chosen in accordance with an index—for example, all event records of the month of September associated with a certain driver. Upon the carefully selected records recalled as described, a mathematical analysis may be applied to produce an output which might reflect a vehicle operators performance. executing an algorithm to realize a ratio between the resultant of two algorithms applied to two different field elements.

A mathematical analysis is applied in a method step directed to address any plurality of event records. An prescribed algorithm arranged to effect a ratio between any two field elements is particularly useful in expressing some driver performance measures and those are explicitly part of these teachings. A ratio with a time based unit in the denominator is exemplary. For example, the "number of infractions per year" is a ratio of considerable importance for expressing a driver performance. Another is "number of infractions per mile". Of course, reciprocals are equally effective in expressing the same information and are considered included alternatives.

Results from mathematical analysis may be expressed in several ways including real-time graphical display, printed reports, as inputs to triggers. Thus, methods of these inventions include 'providing an output report' step is further characterized as a report having a plurality of resultants produced by application of the mathematical analysis.

A driver performance report of particular importance includes a single-value performance coefficient which is derived from the results of and plurality of analysis. Weighted coefficients applied to algorithm resultants form basis for such single-value output in best arrangements.

One will now fully appreciate how video event recording systems provide foundation for systems which yield driver performance measures. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

What is claimed is:

1. A system configured to determine a vehicle operator performance measure and improve vehicle operator performance, the system comprising:
    an operator identity system configured to receive operator identity information that identifies periods of time a vehicle operator operates a vehicle;
    an associator configured to:
        obtain the operator identity information;
        receive event records that include information related to vehicle operation during vehicle events;
        associate event records for vehicle events that occur while the vehicle operator operates the vehicle with the operator identity information; and
        form datasets comprising the operator identity information and the associated event records; and
    an analyzer configured to:
        analyze the datasets to determine a vehicle operator performance measure for the vehicle operator;
        generate vehicle operator performance counseling information based on the vehicle operator performance measure, wherein the vehicle operator performance counseling information includes progressive discipline information determined based on one or more of:
            (i) a quantity of vehicle events during the periods of time the vehicle operator operates the vehicle,
            (ii) a type of vehicle events during the periods of time the vehicle operator operates the vehicle,
            (iii) a severity of vehicle events during the periods of time the vehicle operator operates the vehicle, and/or
            (iv) a number of prior counseling sessions,
            wherein the progressive discipline information includes an assessment of whether performance of the vehicle operator improved in response to the prior counseling sessions; and
        facilitate presentation of the vehicle operator performance counseling information to the vehicle operator.

2. The system of claim 1, wherein the analyzer is configured to generate the vehicle operator performance counseling information responsive to the vehicle operator performance measure breaching a vehicle operator performance measure threshold.

3. The system of claim 1, wherein the associator is configured to receive event records that include information related to vehicle operation during multiple vehicle events that occur during the periods of time the vehicle operator operates the vehicle; and
    wherein the analyzer is configured to generate the vehicle operator performance counseling information based on the multiple vehicle events.

4. The system of claim 3, wherein the analyzer is configured such that the vehicle operator performance counseling information changes based on one or more of a number of vehicle events that occur while the vehicle operator operates the vehicle, or a type of vehicle event that occurs while the vehicle operator operates the vehicle.

5. The system of claim 1, wherein the analyzer is configured such that the generated vehicle operator performance counseling information is an alert.

6. The system of claim 5, wherein the analyzer is configured to communicate the alert to an external computing system.

7. A method for determining a vehicle operator performance measure, the method comprising:
    receiving operator identity information that identifies periods of time a vehicle operator operates a vehicle, the operator identity information including a vehicle operator identifier, a vehicle identifier, and time ranges that correspond to the periods of time the vehicle operator operates the vehicle;
    receiving event records that include information related to vehicle operation during vehicle events from a vehicle event recorder;
    associating event records for vehicle events that occur while the vehicle operator operates the vehicle with the operator identity information;
    forming datasets comprising the operator identity information and the associated event records;
    transmitting the datasets to a data store;
    analyzing the datasets to determine a vehicle operator performance measure for the vehicle operator, the analysis of the datasets based on a mathematical algorithm determined based on one or more of the operator identity information or the associated event records;

generating vehicle operator performance counseling information based on the vehicle operator performance measure, wherein the vehicle operator performance counseling information includes progressive discipline information determined based on one or more of:
  (i) a quantity of vehicle events during the periods of time the vehicle operator operates the vehicle,
  (ii) a type of vehicle events during the periods of time the vehicle operator operates the vehicle,
  (iii) a severity of vehicle events during the periods of time the vehicle operator operates the vehicle, and/or
  (iv) a number of prior counseling sessions,
  wherein the progressive discipline information includes an assessment of whether performance of the vehicle operator improved in response to the prior counseling sessions; and facilitating presentation of the vehicle operator performance counseling information to the vehicle operator.

8. The method of claim 7, further comprising receiving entry and/or selection of the operator identity information via a tactile input device, the tactile input device housed by a first housing that is physically separate and distinct from a vehicle event recorder housing that houses the vehicle event recorder.

9. The method of claim 7, further comprising selecting the mathematical algorithm from an algorithm library.

10. The method of claim 9, wherein at least one of the algorithms in the algorithm library is a machine learning algorithm.

11. The method of claim 10, wherein the machine learning algorithm fits historical data for multiple vehicle operators to a vehicle operator performance measure function, the vehicle operator performance measure function including one or more of a linear regression, a logistic regression, or a neural network.

12. The method of claim 7, wherein the vehicle operator performance measure indicates one or more of how well the vehicle operator minimizes exposure to a risk of being in a vehicle accident, how well the vehicle operator minimizes an amount of fuel consumed while operating the vehicle, how well the vehicle operator maximizes a usable life of mechanical components of the vehicle, how well the vehicle operator meets expectations while performing scheduled tasks, or how well the vehicle operator meets corporate compliance standards and procedures associated with the vehicle.

* * * * *